June 4, 1935.  C. B. WELCH  2,003,764
PISTON AND RING
Filed Sept. 29, 1933
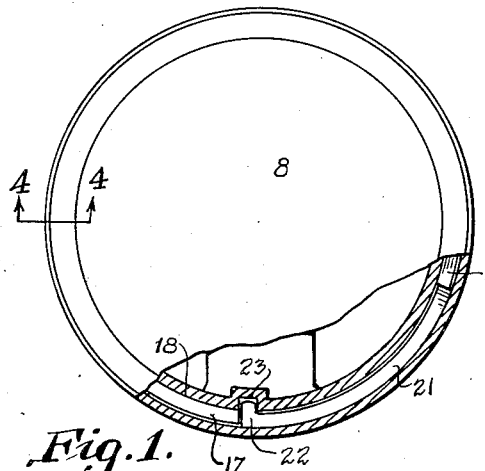
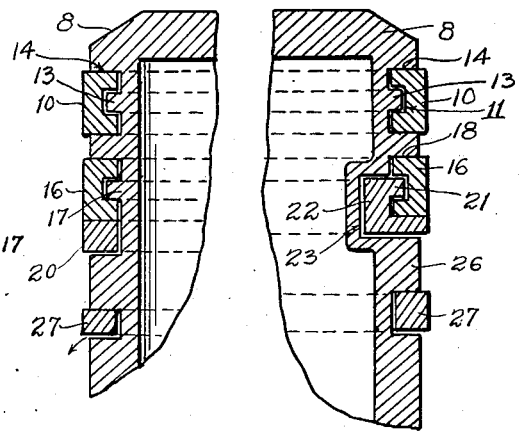
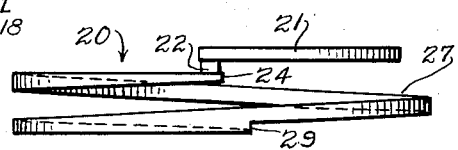
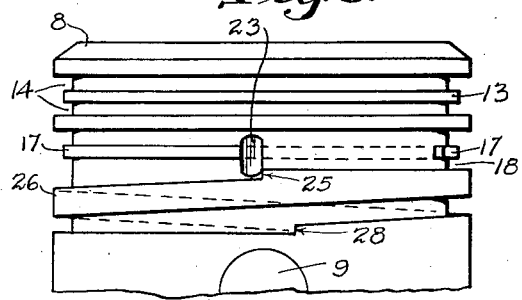
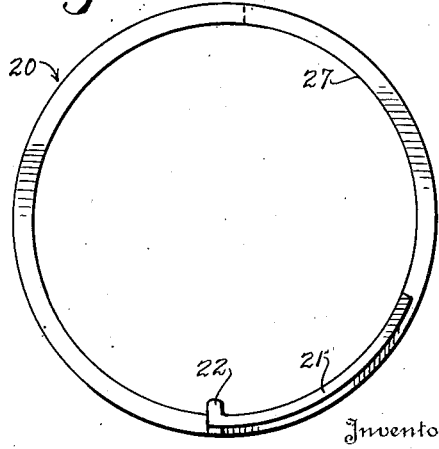
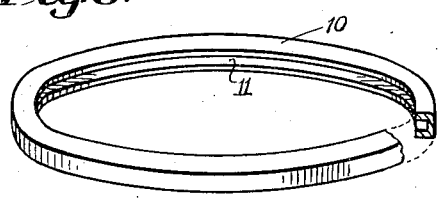
Inventor
CARL B. WELCH
By Mason Fenwick & Lawrence
Attorneys Patented June 4, 1935

2,003,764

UNITED STATES PATENT OFFICE 2,003,764

PISTON AND RING

Carl B. Welch, Attapulgus, Ga.

Application September 29, 1933, Serial No. 691,549

7 Claims. (Cl. 309—42)

This invention relates to improvements in pistons and piston rings, and more particularly to rings of an expansible type designed to assure close contact with a cylinder wall.

In the usual type of piston ring it is common for the same to become worn, which results in weak compression, pumping of oil and general inefficient engine operation.

The prime object of my invention is to provide a seal against the leakage of oil under the ring and at the same time assure close contact between the piston ring and the cylinder wall.

Another object is to provide sufficient oiling of the cylinder wall and prevent excessive heating and wearing.

Still another object is to provide a helical ring as an oil wiper which prevents piston slap and egg-shape wearing of the cylinder wall.

In the drawing:

Figure 1 is a fragmentary elevation of the upper part of a piston equipped with the present invention;

Figure 2 is a top plan of the piston partly broken away on line 2—2 of Figure 1;

Figure 3 is an elevation of the piston shown in Figure 1, with the piston rings removed;

Figure 4 is a fragmentary vertical section taken on line 4—4 of Figure 2;

Figure 5 is a vertical section taken on the line 5—5 of Figure 1;

Figure 6 is an elevation of the helical oil ring of the present invention;

Figure 7 is a plan view of the oil ring shown in Figure 6; and

Figure 8 is a perspective view of one of the compression rings forming a part of the ring assembly shown in Figures 1, 4, and 5 of the drawing.

Referring to the drawing, in which similar parts are designated by like numerals:

In Figure 1 of the drawing, the piston 8 is illustrated as provided with a system of rings positioned in correspondingly shaped grooves formed in the part of the piston above the wrist pin 9.

The system comprises a compression ring 10 having a groove 11 formed in its inner surface and having its ends provided with the usual expanding overlapping joint 12. The ring 10 is positioned over a rib 13 which extends completely around the periphery of the recess 14 formed in the piston. The joint 12, of course, permits the ring 10 to be slipped over the periphery of the piston 8 and into position where it will receive the rib 13 in its groove 11.

A second compression ring 16, similar in every respect to ring 10, is snapped over its rib 17, formed in a similar depression 18, located below the recess for the first ring. The rib 17 extends around the greater part of the periphery of the recess formed in the piston but not all the way, there being a gap left in this rib for a purpose hereinafter explained.

To keep the lower compression ring 16 in yielding contact with the upper shoulder of the groove, in which it is positioned, a helical ring, designated generally by the reference character 20, is located in a helical groove as shown and presses upward against ring 16. The upper part of the helical spring ring 20 comprises a segmental member 21 of the same thickness as the rib 17, and of such length as to complete the gap left in the rib.

The part 21 is provided on its end with an inturned lug 22 adapted to seat in a recess 23 formed in the recess 18 of the piston 8. The helical spring part 27 of the ring 20 is secured to the lower end of the lug 22 and has its outer periphery of the same diameter as that of the rings 10 and 16. The upper part of the helical spring terminates in a shoulder 24 which seats against a shoulder 25 formed on an irregularly shaped inclined rib 26. From the shoulder 24, the helical spring part 27 of the ring 20 extends around the piston in contact with the upper face of the rib 26, which likewise extends around and is formed on the piston. The rib 26 terminates in an abutment 28. The part 27 continues around the piston to the point 28 where it is provided with a shoulder 29, beyond which it continues in the last or lower convolution of the groove around the piston. The ribs 13 and 17 which fit into the grooves of the compression rings, are for the purpose of keeping the joint sealed even after the ring is worn on the cylinder sides, thereby allowing it to expand and get farther away from the bottom of the groove 14. The rib and groove joint cannot wear and is, therefore, a fitted joint at all times and assures against the leaking of oil under the ring.

The helical spring part 27 not only serves to hold the second ring 16 in contact with its upper shoulder, but also serves as a wiper ring, or oil ring. The segment 21 exerts an outward pressure against this second compression ring to eliminate piston slap, as will be apparent from the drawing. The ribs are designed to fit in the grooves formed on the inner surface of the two compression rings, and the rib 26 is that part of piston 8, occupying the space between the several convolutions of the helical groove provided for the helical spring part 27 of the ring 20.

It will be understood, of course, that a ring assembly may be arranged in the part of the piston below the wrist pin 9 similar to that shown in Figure 1. For convenience of disclosure and illustration, the power part of the piston has not been shown.

In assembling the rings, it will be necessary to first apply the helical spring ring 20 in its groove, so that its lug 22 seats in the recess 23, formed in the piston so that the segment 21 shall be lined up with and fill in the gap of the rib of the second compression ring. Next, the second compression ring is snapped over the rib 17 in the groove for same, also over segment 21 to lock the coil spring ring 20 in position on the piston, and finally the upper ring 10 is snapped over its rib 13 in its respective groove.

What I claim is:

1. A piston having parallel grooves formed in the periphery thereof and a helical groove extending from the lowermost of said grooves downwardly, compression rings positioned in said parallel grooves, and a helical ring positioned in said helical groove under axial compression against the lowermost compression ring.

2. A piston having parallel grooves formed in the periphery thereof, compression rings positioned in said grooves, and a helical spring cylinder wiping ring member mounted on said piston below said rings to press the lower of said rings axially upward in its groove.

3. A piston having parallel grooves formed in the periphery thereof, compression rings positioned in said grooves, a helical spring cylinder wiping ring member mounted on said piston to press the lowermost compression ring upward in its groove, and means for locking said helical spring member against bodily rotation around said piston while permitting rotation of the lowermost compression ring.

4. A piston having parallel grooves formed in the periphery thereof, compression rings positioned in said grooves, a helical spring cylinder wiping ring member mounted on said piston below the lowermost compression ring to press said ring upward axially in said groove, and cooperative interlocking means formed on said piston and spring member to prevent bodily rotation of the helical spring member around said piston while permitting rotation of the lower compression ring.

5. A piston having parallel grooves formed in the periphery thereof, a rib extending partly around the bottom wall of the lowermost of said grooves whereby a gap is left in said rib, a rib extending completely around the bottom wall of the uppermost groove, compression rings positioned in each of said grooves and each compression ring having a groove around its inner periphery for receiving said ribs, a cylinder engaging helical spring member positioned below said lower compression ring to force said lower ring axially upward on said piston, and a segment connected to the upper end of said spring member and positioned in the lowermost of the parallel piston grooves to complete the gap in the rib formed therein and seat in the groove of the lowermost compression ring.

6. A piston having a circumferential groove with a rib formed in the bottom of said groove extending around a substantial part of said groove whereby a gap is left in said rib, and having a helical groove extending from said circumferential groove downwardly on the piston, a compression ring adapted to be positioned in the circumferential groove, said ring having a groove adapted to receive the rib specified, and a helical spring ring having a segmental part at one end adapted to fill the gap in the rib within the circumferential groove of the piston and be positioned in the groove in the compression ring, said helical ring other than the segmental part thereof positioned in said helical groove.

7. The structure of claim 6 with means at the juncture of the segmental part with the remainder of the helical ring for engaging the piston to prevent rotation of the helical ring.

CARL B. WELCH.